Feb. 23, 1926.

R. A. MANNING 1,573,842

BOTTLE WASHING MACHINE

Original Filed July 30, 1920  7 Sheets-Sheet 1

Inventor
R. A. Manning
By
Attorney

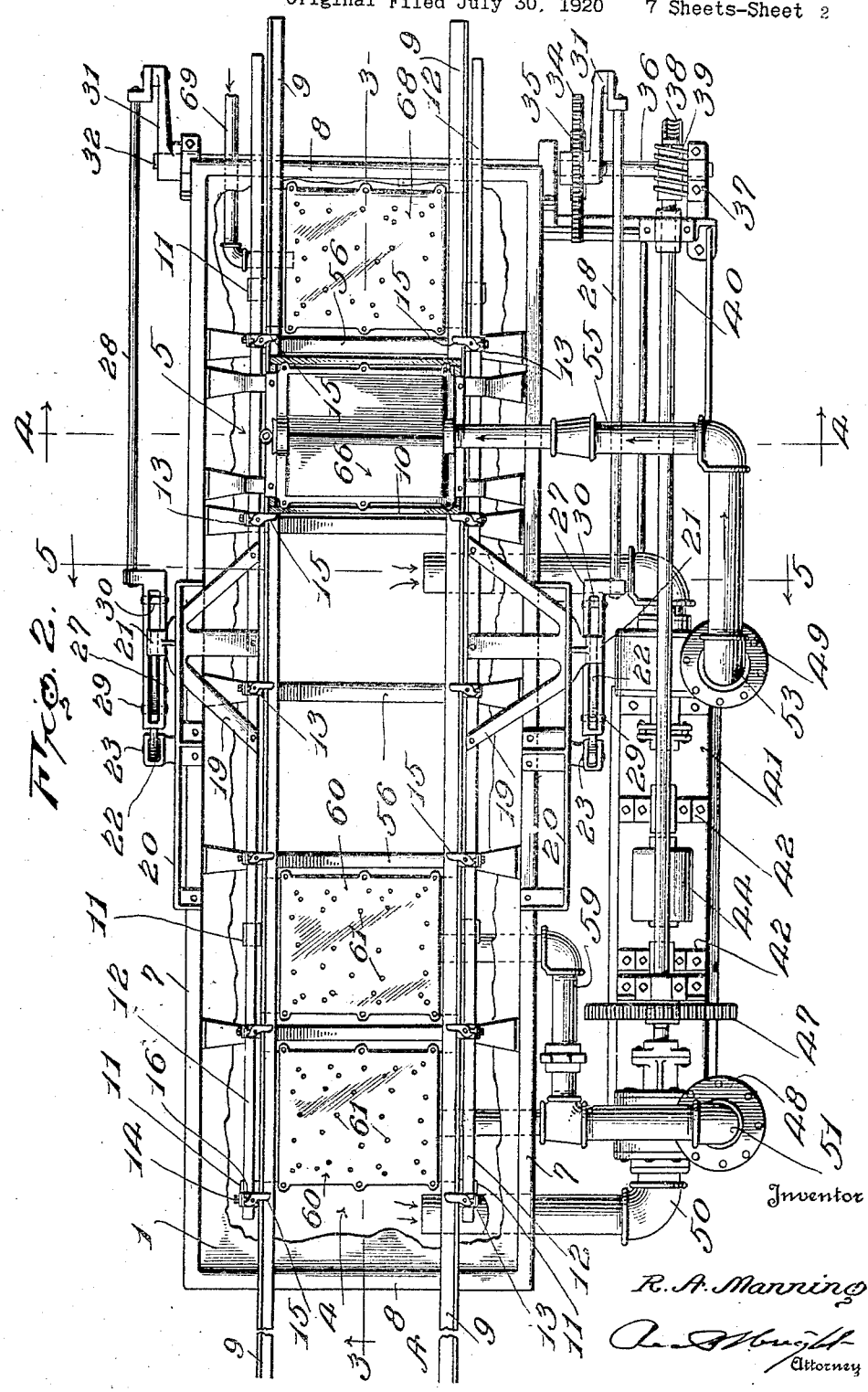

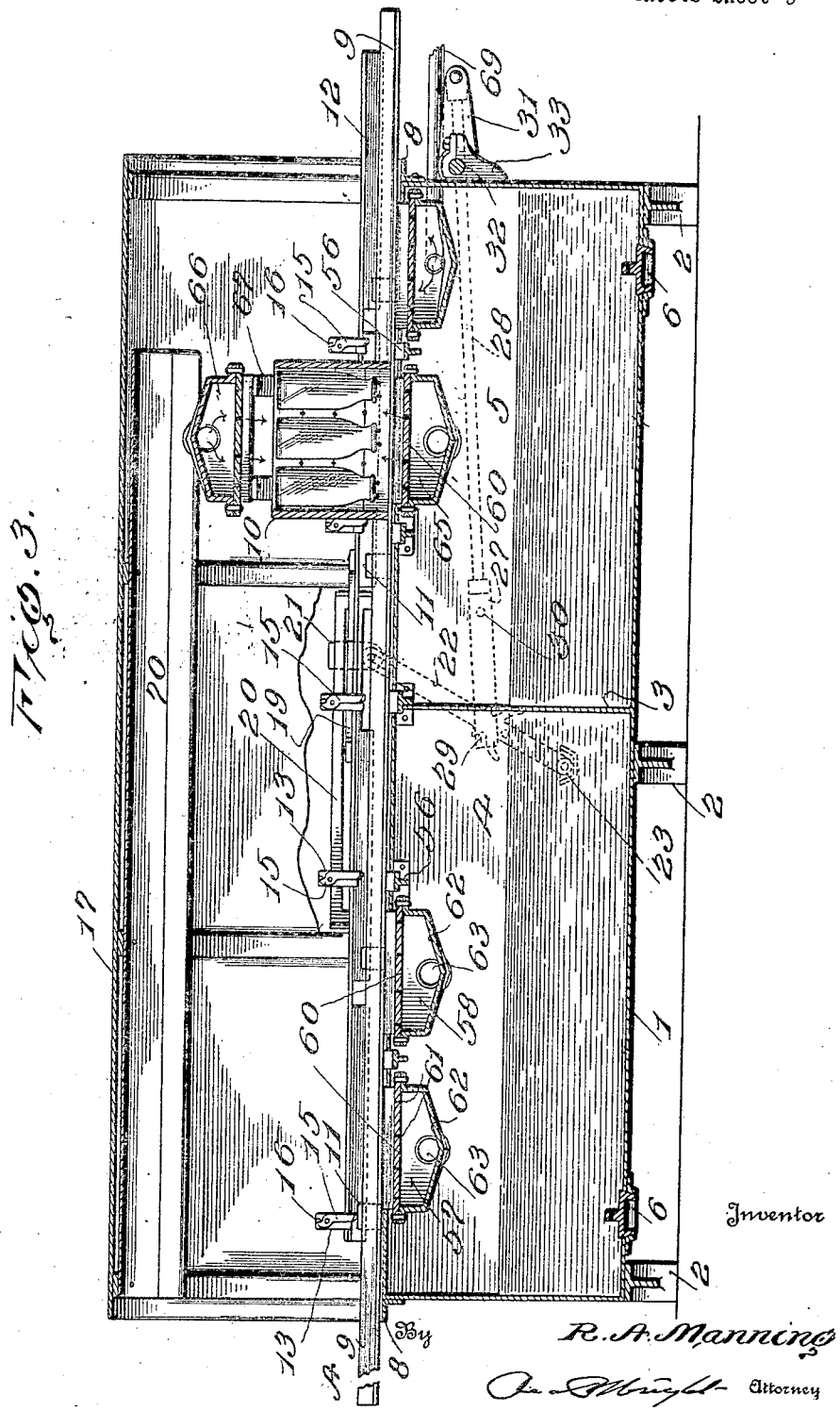

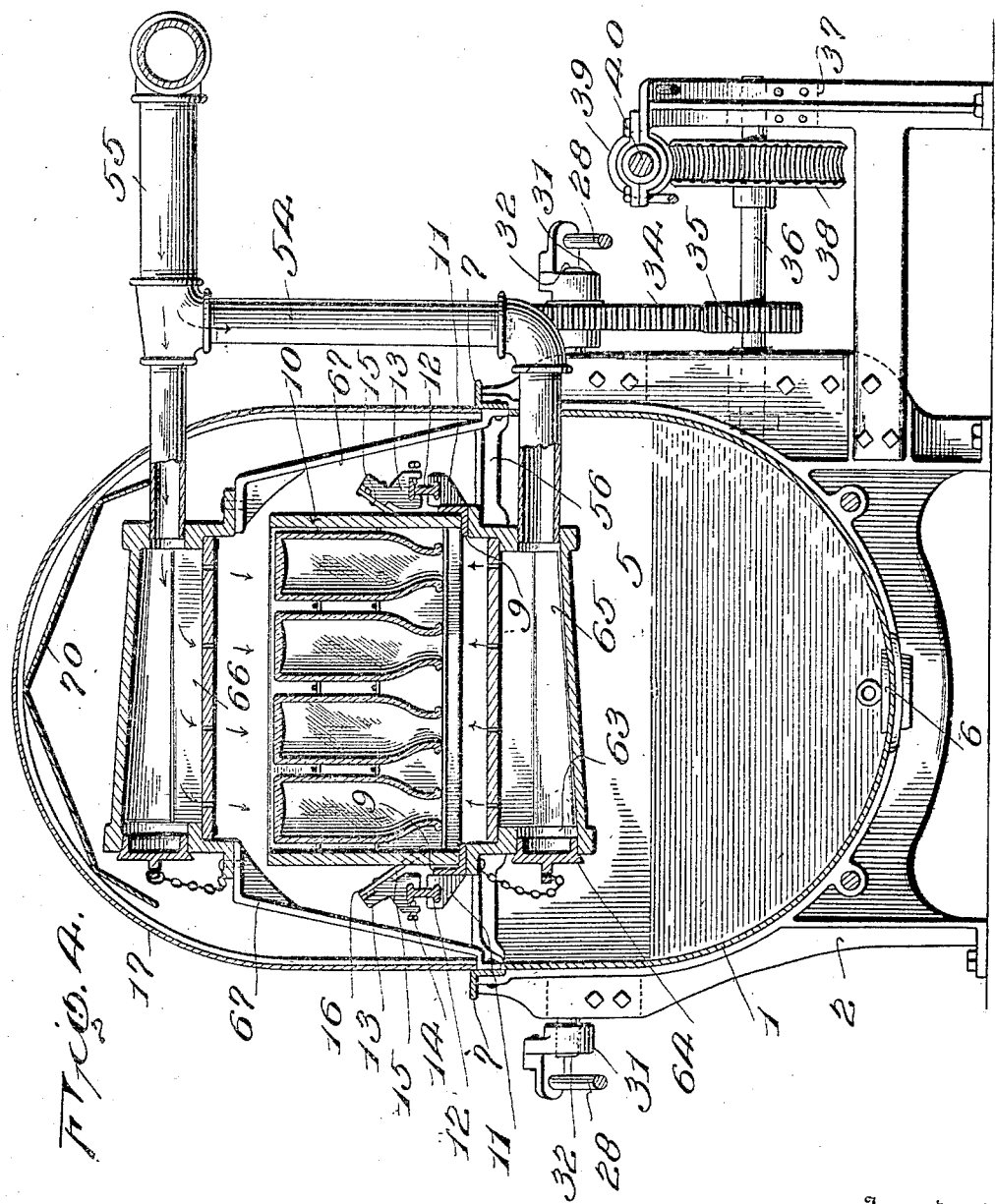

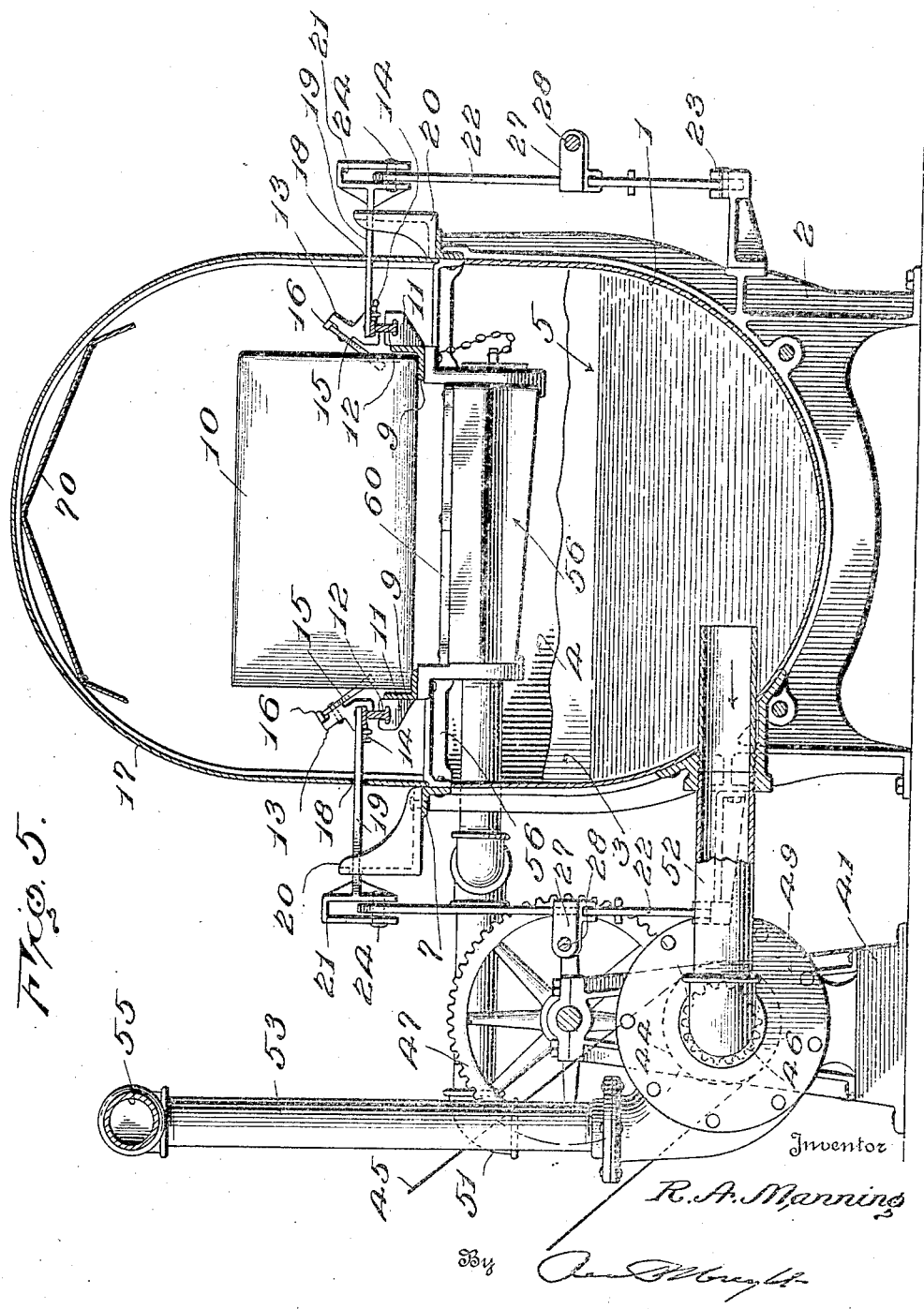

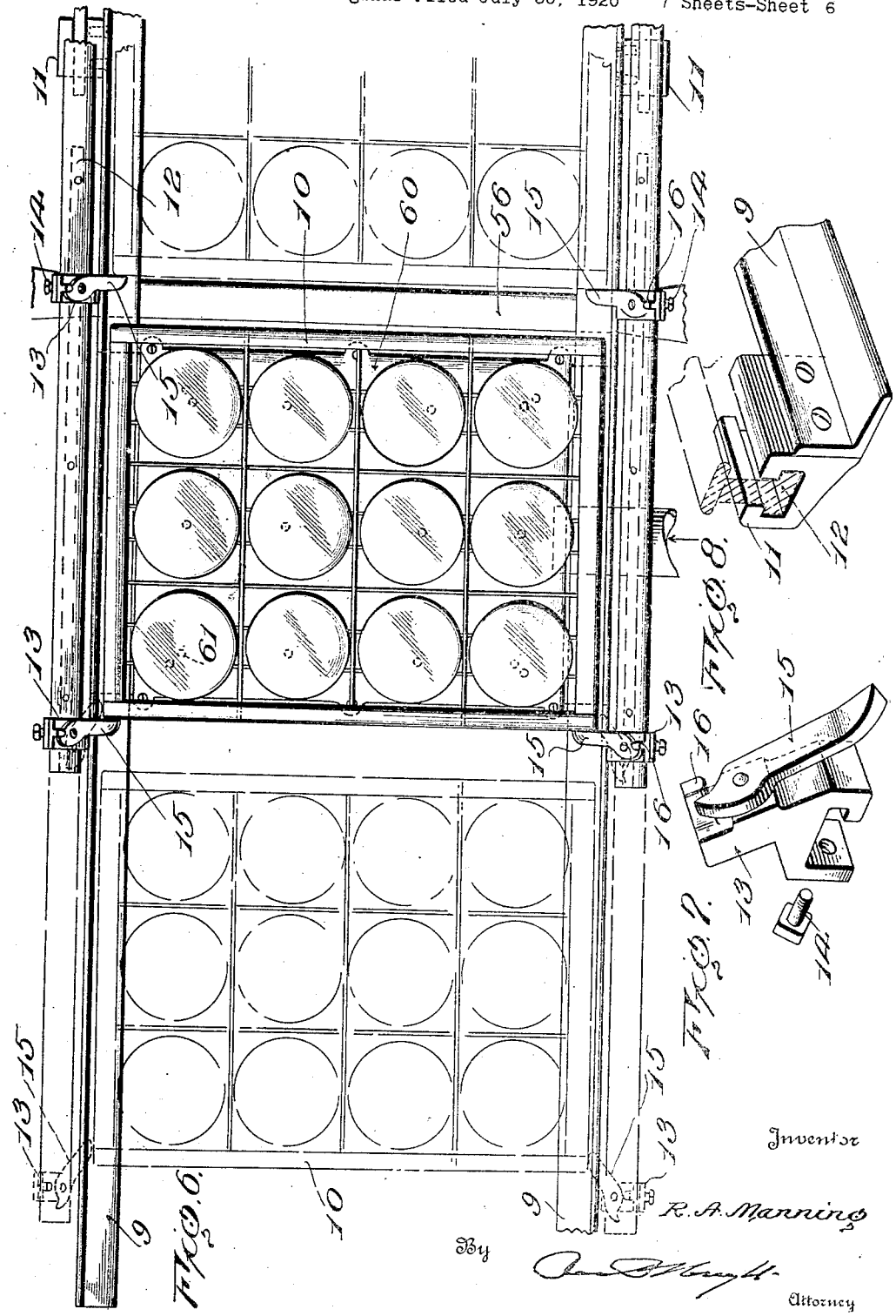

Feb. 23, 1926.
R. A. MANNING
1,573,842
BOTTLE WASHING MACHINE
Original Filed July 30, 1920   7 Sheets-Sheet 7
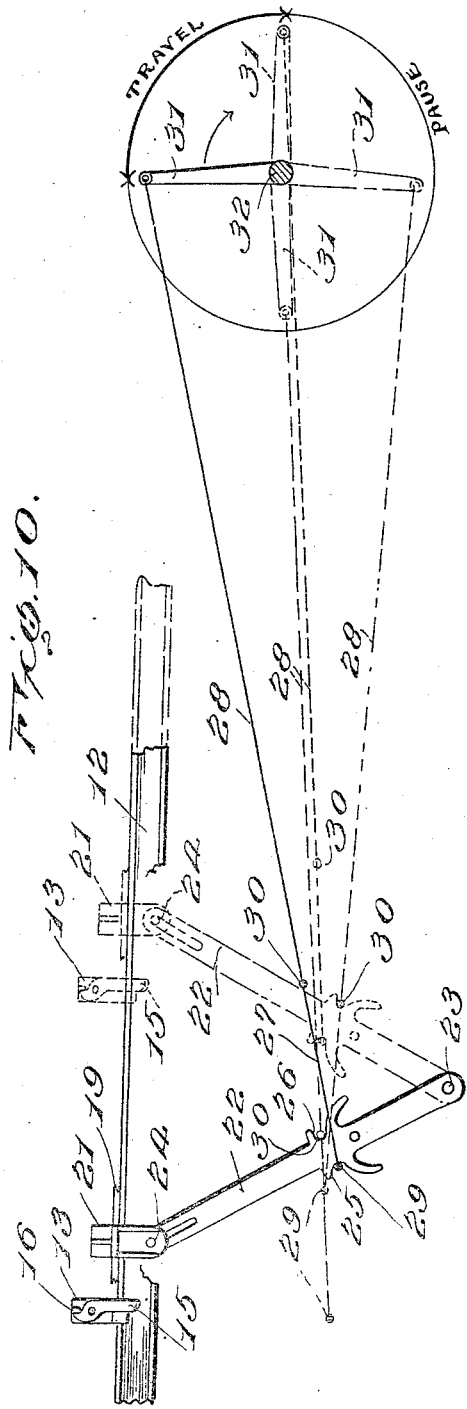
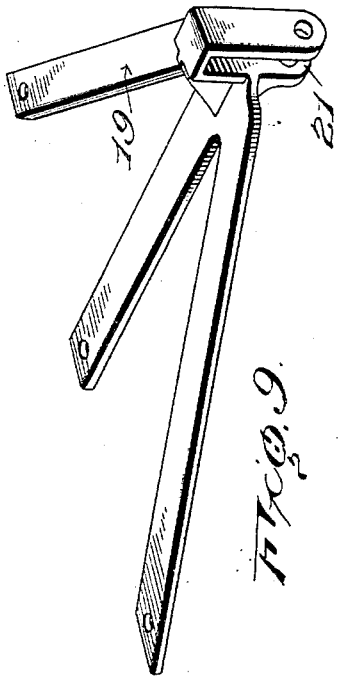
Inventor
R. A. Manning
Attorney Patented Feb. 23, 1926.

1,573,842

UNITED STATES PATENT OFFICE.

ROY A. MANNING, OF RUTLAND, VERMONT, ASSIGNOR TO MANNING MANUFACTURING COMPANY, OF RUTLAND, VERMONT, A CORPORATION OF VERMONT.

BOTTLE-WASHING MACHINE.

Original application filed July 30, 1920, Serial No. 400,007. Divided and this application filed December 31, 1920. Serial No. 434,276.

*To all whom it may concern:*

Be it known that I, ROY A. MANNING, a citizen of the United States, residing at Rutland, in the county of Rutland and State of Vermont, have invented certain new and useful Improvements in Bottle-Washing Machines, of which the following is a specification, reference being had therein to the accompanying drawings.

This invention relates to certain new and useful improvements in bottle washing machines and is a division of my application for bottle washing machines, filed July 30, 1920, Serial No. 400,007, the object of this invention being to provide a machine which is exceedingly simple and cheap in construction, the parts being so arranged that all danger of the machine getting out of order when in operation is prevented.

A still further object of the invention is to provide novel means for intermittently carrying the cases through the machine so that the cases will stop over the jet boxes and remain in that position for a predetermined time in order to allow the jets of fluid to act thoroughly on the bottles in the cases.

Another and still further object of the invention is to provide novel means for supporting the cases in their travel through the machine whereby cases of various widths can be employed so that the machine is capable of using cases manufactured by different concerns.

A further object of the invention is to provide a case puller for moving the cases through the machine having a plurality of pivoted dogs arranged in pairs oppositely disposed in such a manner that individual case pullers are provided to insure the positioning of the cases over the jet boxes.

A still further object of the invention is to provide driving means in the form of a crank and pitman so constructed and connected to the case pusher that a pause is produced which can be varied by the slot in the pitman.

Other and further objects and advantages of the invention will be hereinafter set forth and the novel features thereof defined by the appended claims.

In the drawings,

Figure 2 is a plan view of the apparatus, the tank cover being removed;

Figure 3 is a longitudinal section through the apparatus taken on line 3—3 of Figure 2 showing a case of bottles in position over the rinsing jet box;

Figure 4 is a transverse vertical section taken on line 4—4 of Figure 2 showing a case moved between the upper and lower jet boxes for thoroughly cleaning the inner and outer surfaces of the bottles in the case;

Figure 5 is a transverse section taken on line 5—5 of Figure 2 showing a case puller and the case dogs in engagement with the case and the outlet of the tank leading to the pump;

Figure 6 is a top plan view showing the case dogs in engagement with the case of bottles;

Figure 7 is a perspective view of one of the case dogs and its support showing the means for connecting the same to the rails;

Figure 8 is a detail perspective of one of the rail guides;

Figure 9 is a perspective view of one of the arms for connecting the rails to the rocker levers; and Figure 10 is a diagrammatic view illustrating the movement of the crank and its connection with the rails for causing a pause in the movement of the rails to provide an intermittent movement.

Figure 1:
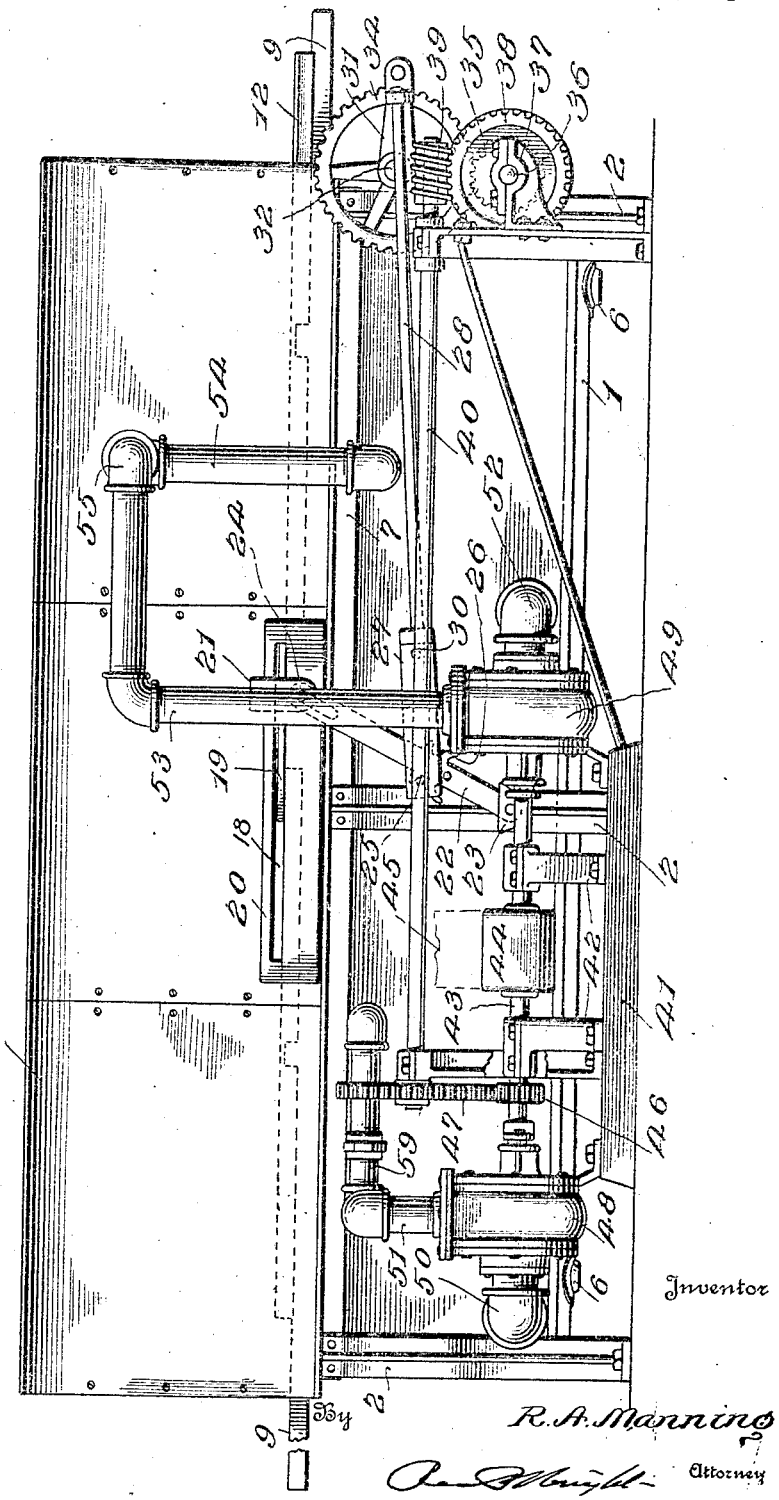
Figure 1 is a side elevation of a bottle washing apparatus constructed in accordance with my invention.

In carrying out my invention I employ an oblong tank 1 substantially semi-circular in shape in cross section mounted on legs 2 and provided with a partition 3 forming compartments 4 and 5, the compartment 4 being adapted to contain a washing fluid such as alkali water and the compartment 5 clear water for rinsing the bottles as will be hereinafter fully described. Each compartment is provided with a drain plug 6.

The upper edges of the tank 1 are provided with angle irons 7 connected together by cross bars 8 carrying angle irons 9 forming a guide way for a case 10 as clearly shown in Figures 4 and 5. The case 10 is adapted to contain bottles or analogous articles arranged in inverted position as clearly shown in Figure 4 with their mouths downwardly so that the jets of fluid pass into the bottles as will be later described.

Connected to the angle irons 9 forming the guide way are rail guides 11 in which are slidably mounted substantially I-shaped rails 12 on which are adjustably mounted dog supports 13 which are clamped in adjusted position by bolts 14, said supports carrying pivoted dogs 15 which are capable of swinging in one direction but are stopped from swinging in the opposite direction by engaging the lugs 16, said dogs being adapted to engage the case of bottles as clearly shown in Figure 6, the dogs being arranged in pairs in transverse alignment with one another and spaced apart longitudinally a sufficient distance to allow a case to be placed between the same whereby individual case pushers are provided whereby I am able to move the cases the proper distance so that the mouths of the bottles will be centered over the holes in the jet boxes as will be hereinafter fully described.

The tank is enclosed by a hood or cover 17 herein shown formed of three sections, the central section being provided with longitudinally disposed slots 18 through which extend pushers arms 19 slidably mounted in suitable guides 20 carried by the angle irons 7 of the tank, said pusher arms 19 having their inner ends connected to the rails 12 as shown in Figure 2, the outer ends being provided with a bifurcated portion 21 into which is adapted to extend the slotted upper ends of rocker levers 22 which are mounted in suitable bearings 23 carried by the legs 2.

The rocker levers are connected to the pusher arms 19 by pins 24 extending through apertures in the furcations of the arms 19 and the slot of the rocker levers as clearly shown in Figure 3 in order to provide a sliding and pivotal connection. The rocker levers 22 are provided with oppositely disposed notches 25 and 26 formed by outwardly extending fingers, the upper fingers extending substantially laterally from the rocker levers and the lower fingers extend downwardly in order to provide a curved guide for the purpose hereinafter fully described. The rocker levers 22 are arranged in a slotted member 27 carried by the end of the pitman 28, the member 27 having pins 29 and 30 extending across the slot thereof which are adapted to cooperate with the notches 25 and 26 of the rocker levers as shown in the diagrammatic view.

While I have shown the pitman rod formed of two sections, one of which is in the form of a slotted member it is of course understood that a pitman rod formed of a single piece having a slot can be used and I do not wish to limit myself to these details of construction as I am aware that various changes can be made without departing from the spirit of my invention.

The pitman rods 28 which are arranged on each side of the tank are connected to crank arms 31 carried by crank shaft 32 mounted in suitable bearings 33 secured to the end of the tank 1 as shown in Figure 3. When the crank shaft is rotated the pitman rods are reciprocated as clearly shown in the diagrammatic view so that the rocker levers are rocked intermittently or a pause is produced which is determined by the length of the slot in the pitman rod so that the case pullers will only move intermittently, moving a case a predetermined distance so as to center the bottles over the jets and then stop for a predetermined time so as to allow the fluid to thoroughly wash and rinse the bottles in the case. The crank shaft 32 carries a gear 34 meshing with a pinion 35 carried by a shaft 36 mounted in a suitable support 37 connected to one of the legs, said shaft being provided with a worm wheel 38 meshing with the worm 39 carried by shaft 40 by means of which the crank shaft is rotated as will be hereinafter fully described.

Arranged at one side of the tank is a base 41 provided with suitable bearings 42 in which is mounted drive shaft 43 herein shown provided with a pulley 44 over which is adapted to extend a belt 45 for driving the same, said shaft being provided with a pinion 46 meshing with the gear 47 secured on the end of the shaft 40 as clearly shown in Figure 1. Supported by the base are rotary pumps 48 and 49 which may be of any of the well known types of pumps now in use, the pump 48 being provided with an inlet 50 extending into the compartment 4 of the tank and an outlet 51 from its top extending into the compartment 4 of the tank and connected to one of the jet boxes as will be later described. The pump 49 is provided with an inlet 52 extending into the compartment 5 of the tank and an outwardly extending outlet 53 which is provided with a downwardly extending branch 54 extending into the compartment 5 and a branch 55 extending through the hood or cover and adapted to be connected to the jet boxes as will be later described.

Connected to the angle irons 7 carried by the upper edge of the tank 1 are inwardly extending supports 56 carrying jet boxes 57 and 58 disposed within the compartment 4 of the tank, the jet box 57 being connected to the outlet pipe 51 of the pump 48, the jet outlet being provided with a branch 59 and connected to the jet box 58.

The jet boxes are provided with removable covers 60 having jet openings 61 so positioned that when a case of bottles is drawn within the machine the mouths of the bottles will be positioned over the jets. The jet boxes are provided with tapering bottoms 62 which taper towards the longitudinal center and towards one end, each box having an outlet 63 closed by a plug 64 whereby the foreign matter which accumulates in the jet boxes can be readily flushed out by removing the brass plug and starting the pumps. In case the foreign matter should become hardened on non-use of the machine, the jet plates can be removed and the boxes thoroughly cleaned.

Arranged in the compartment 5 is a similar jet box 65 which is supported in a similar manner and is connected with pipe 54 to the pump 49. Arranged above the jet box 65 near the upper portion of the cover is an inverted jet box 66 which is connected to the pipe 55 and is supported by arms 67 in such a manner that a case is free to move between the jet boxes, the upper jet box delivering a series of jets of water onto the outer surface of the receptacles within the case while the lower jet box subjects the inner surface of the bottles or receptacles in the case to the fluid.

A steam jet box 68 is arranged within the compartment 5 and connected to a steam pipe 69 so that before the cases are moved out of the machine the bottles are subjected to live steam so as to thoroughly sterilize the same.

The hood or cover 17 is provided with a deflector 70 so that any fluid thrown upwardly by the jets between the movements of the case over the jet boxes will drain back into the tank.

The operation of the machine is as follows: The case of bottles is placed on the guide way at A and forced into the machine until it is caught by the dogs where it is carried over the first jet box and as the compartment 4 contains a washing fluid which is continuously being circulated by means of the pump the bottles are subjected to streams of washing fluid so as to clean the same, the case then advances over the second jet box where the operation is repeated, it then moves intermittently a predetermined distance as shown in Figure 2 so that the contents will drain out of the bottles and off the cases back into the compartment containing the washing fluid. The same then advances by the pushing dogs until it is positioned over the jet box 65 and under the jet box 66 and as clear water is being circulated from the compartment 5 through these jet boxes, the bottles are subjected to a rinsing action and the case of bottles is then advanced over the steam jet box where the bottles are sterilized.

It will be seen that as the cases are fed into one end of the machine and delivered out of the opposite end the cases move in a guide way through the machine intermittently and in such a manner that by the particular construction of pushing dogs and operating means the cases are positively positioned over the jet boxes so as to allow the jets to deliver streams of washing fluid and water into the mouths of the bottles and as the machine is being driven continuously the cases can be fed into the machine one at a time and they will move intermittently therethrough so as to first subject the bottles to a cleaning fluid and then to a rinsing fluid and then to live steam for sterilizing the bottles before they leave the machine.

As the crank shaft rotates the pitmans move forward and through their connection with the guide rails, the guide rails are moved rearwardly and in this movement the pusher dogs swing on their pivots so as to pass by the case which remains stationary over the jet boxes and as the crank continues to rotate the rocker arms are not engaged until the crank has reached the position shown in the diagrammatic view where the rocker arms are rocked so as to move the rails forward and in this movement the dogs engage the cases and advance the same through the machine and by this particular construction a pause in the operation is obtained so that the cases remain stationary over the jet boxes a sufficient length of time to allow the jets to act thoroughly on the bottles within the cases.

While I have shown certain details of construction of the various parts of the machine I do not wish to limit myself to these details as I am aware that various changes can be made without departing from the spirit of my invention.

What I claim is:—

1. In an apparatus of the kind described, the combination with a longitudinally disposed guideway for supporting articles to be moved, of slidably mounted rails arranged above said guideway, pivoted gravity dogs carried by said rails for engaging the members in said guideway and moving said members in one direction, rocker levers having a slidable and pivotal connection with said rails, said rocker levers having spaced fingers on the edges and slotted pitmans embracing said rocker levers having spaced pins arranged between said fingers for intermittently reciprocating said rails.

2. A conveyor apparatus comprising a guideway for articles to be moved, a rail slidably mounted to each side of said guideway, supports embracing said rails and adjustably mounted thereon and provided with lugs, pivoted gravity dogs mounted on said supports and prevented from swinging in one direction by said lugs for moving said articles in one direction in said guideway, rocker levers having a slidable and pivotal connection with said rails, said rocker levers having spaced fingers on their edges and slotted pitmans embracing said rocker levers having spaced pins arranged between said fingers for intermittently reciprocating said rails.

3. A conveyor apparatus comprising a guideway for articles to be moved, a rail slidably mounted to each side of said guideway, supports embracing said rails and adjustably mounted thereon, pivoted gravity dogs mounted on said supports and capable of swinging in one direction only for moving the articles in one direction in said guideway, pusher arms connected to said rails provided with bifurcated end portions, rocker levers having slotted end portions extending into the bifurcations of said pusher arm, pins extending through the furcations of said bifurcated members and the slots of said rocker levers for forming a pivotal and sliding connection between said pusher arms and said rocker levers, a crank shaft, pitmans connected to said crank shaft having slotted members embracing said rocker levers for intermittently reciprocating said rails for moving the articles intermittently in said guideway.

In testimony whereof I hereunto affix my signature.

ROY A. MANNING.